April 3, 1928.

J. F. LINDBERG 1,664,518

ELECTROSTATIC CONDENSER

Filed March 21, 1927    2 Sheets-Sheet 1

Inventor
John F. Lindberg
By G. K. Cragg Atty

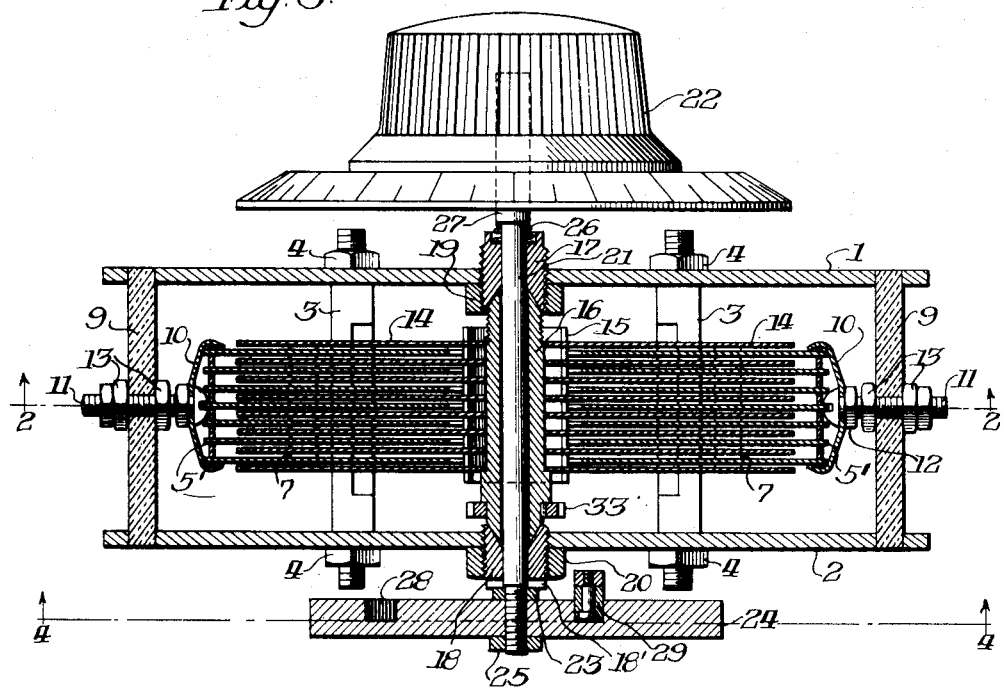
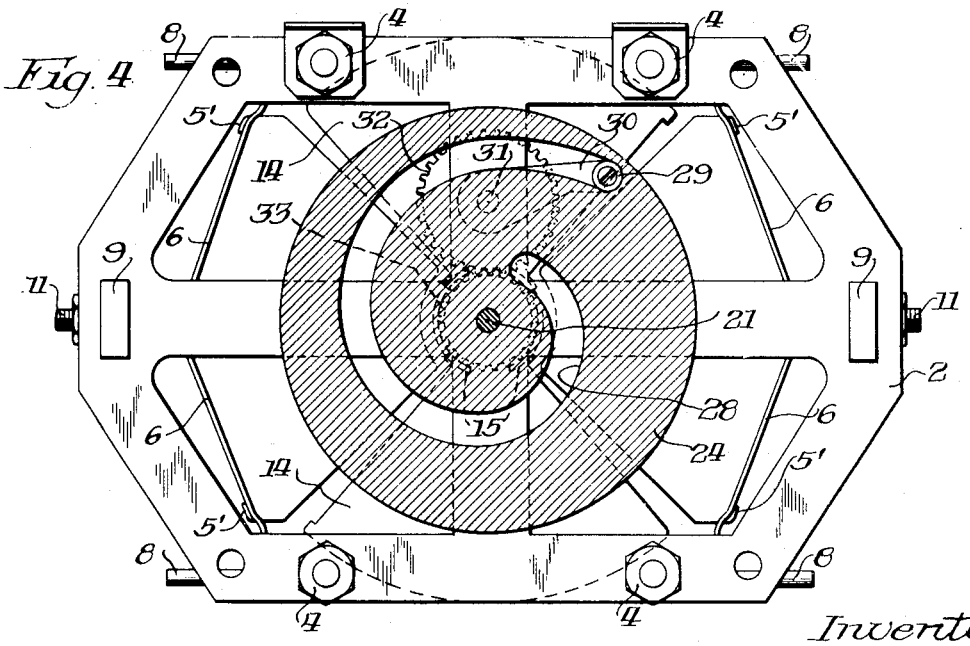

Patented Apr. 3, 1928.

1,664,518

UNITED STATES PATENT OFFICE.

JOHN F. LINDBERG, OF CHICAGO, ILLINOIS, ASSIGNOR TO RELIANCE DIE & STAMPING COMPANY, OF CHICAGO, ILLINOIS, A CORPORATION OF ILLINOIS.

ELECTROSTATIC CONDENSER.

Application filed March 21, 1927. Serial No. 177,043.

My invention relates to electrostatic condensers that are inclusive of rotors and has for one of its objects the provision of means whereby the rate of turning of the rotor may be varied with respect to the rate of turning of the operating handle so as to effect desired regulation of the condenser capacity.

The invention has for another of its objects the provision of a plurality of stators for a rotor common thereto and means for guarding the stators from intercapacity relation.

In carrying out the first object of my invention, I employ a lever coupled with the rotor to turn it, a cam in actuating relation with said lever, and a rotatable handle coupled with the cam to turn it, the cam being formed to vary the rate of turning movement of said lever, and thereby of the rotor, with respect to the rate of turning movement of the handle.

In carrying out the second object of my invention, a minimum of two stators are preferably placed in the zone or plane of rotation of the rotor with the rotor between said stators, a portion of the rotor electrically connected with the balance thereof being interposed between the stators to serve as a shield to prevent intercapacity relation of the stators. This shielding portion of the rotor may be the metallic rotor shaft and, preferably, a metallic sleeve surrounding the shaft and fixed thereon, this sleeve carrying the plates of the rotor.

Figure 1:
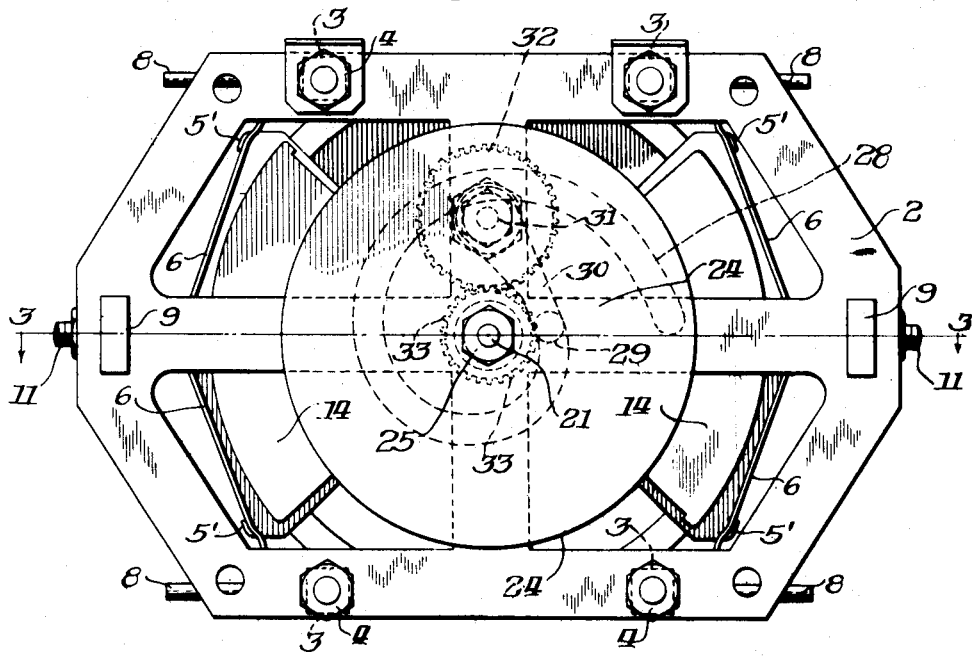
Figure 2:
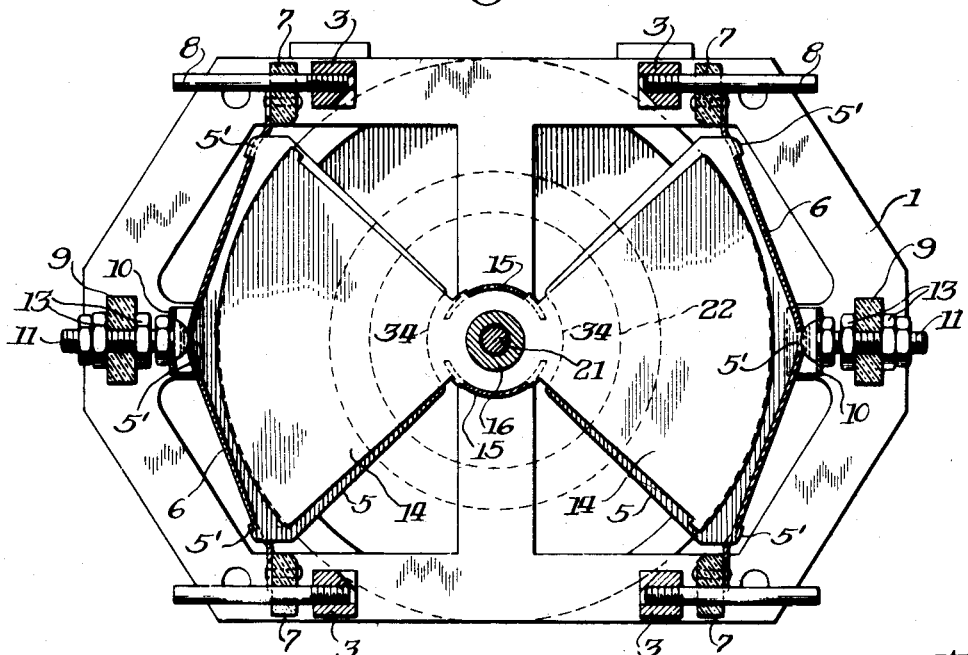

The invention will be more fully explained in connection with the accompanying drawings in which Fig. 1 is a side view of a condenser constructed in accordance with the preferred embodiment of the invention; Fig. 2 is a sectional view on line 2—2 of Fig. 3; Fig. 3 is a sectional view on line 3—3 of Fig. 1; and Fig. 4 is a sectional view on line 4—4 of Fig. 3.

The condenser illustrated includes two metallic frames 1, 2 which are assembled with and by distance preserving struts 3 whose major portions are interposed between the frames and which have reduced threaded ends that receive clamping nuts 4. Two stators are employed, each stator being inclusive of a group of triangular metallic plates 5. The plates of each stator are electrically connected by a metallic strip 6 through which the lugs 5' on the plates 5 project, these lugs and said strip being brazed together. Insulating blocks 7 are carried at the ends of each strip 6 and are formed with holes therethrough which snugly receive the guiding pins 8 that are carried by the struts 3. Insulating bars 9 are assembled with the frames 1 and 2 and pass across the space between these frames. Each stator carries a metallic stirrup 10 which is in firm mechanical and electrical assembly with the metallic strip 6 of said stator and the outside plates of this stator, as indicated clearly in Fig. 3. A screw bolt 11 is passed through each metallic stirrup 10, the head of this screw bolt engaging the inner side of this stirrup, there being a clamping nut 12 which clamps said screw bolt head against said stirrup. The shank of each bolt passes through the adjacent bar 9 and is clamped in engagement therewith by the nuts 13. Each stator may be adjusted in its own plane or zone by suitably positioning said nuts 13. Circuit connections for the stator may be made at said screw bolts.

The plates of each stator converge toward the plates of the other stator, the converging sides of the stator plates substantially intersecting in a common line which constitutes the axis of the rotor which is composed of two groups of triangular metallic plates 14. All of the plates of the rotor are electrically connected by means of a metallic sleeve 15 with which the inner ends of the plates 14 are rigidly assembled. The inner ends of the plates 14 desirably extend sufficiently to also have mechanical and electrical contact with a metallic quill shaft 16 that serves as a part of the means whereby the rotor may be turned. This quill shaft is conically tapered at its ends to enter tapering seats formed in metal bearings 17, 18 that are carried by the frames 1 and 2. These bearings are desirably screwed into the frames that carry them and are maintained in fixed relation with said frames by means of the nuts 19, 20 which are respectively screwed upon said bearings and against said frames. The bearings may be provided with screw driver slots such as indicated at 18' in bearing 18 so as to enable them to be readily turned. The axis of rotation of the rotor is defined by the engagement of the quill shaft 16 by said bearings 17 and 18. Said bearings also journal the shaft 21 which carries a handle, at one end, that is preferably in the form of a knob 22. A collar 23 surrounds the inner end of the shaft 21 and bears against the slotted portion 18' of the bearing 18. The inner end of the shaft 21 passes through a cam 24, this cam being clamped against the collar 23 by a nut 25 that is screwed upon said shaft end. Said shaft is thus held from displacement by outward movement. A spring 26 is interposed between the bearing 17 and a shoulder 27 that is formed upon said shaft 21 whereby the cam 24 is held in a fixed plane of movement. Said spring 26 and shoulder 27 yieldingly prevent inward movement of the shaft 21.

When the knob or handle 22 is turned, it turns said shaft to turn the rotor. Turning movement of the shaft is imparted to the cam 24 whose groove 28 receives the cam roller 29 that is provided upon one end of a crank or lever 30. Said groove 28 is spiral so that as the cam is turned, the rate of turning movement of the lever varies with respect to the rate of turning movement of the cam 24 and the handle 22 that turns with the cam. The lever 30 is journaled upon the frame 2, as indicated at 31. A spur gear 32 is coaxial with the lever and fixed with respect thereto whereby this gear is turned with the lever. The gear 32 is in mesh with a spur pinion or gear 33 which is coaxial with and fixed with respect to the quill shaft 16. Whenever the handle 22 is turned, the rotor is turned but at a rate which varies with respect to the rate of turning movement of the handle to secure a desired rate of change in the condenser capacity per unit of turning movement of the handle.

The two stators are insulated from each other, the plates of the stators tapering toward the axis of rotation of the rotor, the tapering sides of the stator plates being substantially upon radii that intersect said axis. The inner edges of the stator plates are arcuate, as indicated at 34, there being arcuate gaps that intervene between these edges and the metallic sleeve 15 which is in electrical connection with the plates of the rotor. The stators are in the zone of rotation of the rotor, the central portion of the rotor, inclusive of its metallic sleeve 15 and its metallic shaft 16, serving as a shield to prevent intercapacity relation of the stators.

Changes may be made without departing from the invention.

Having thus described my invention, I claim:

An electrostatic condenser including a rotor; a gear member carried by and coaxial with the rotor; a second gear member in actuating relation to the first; a crank coupled with the second gear member to turn it and thereby turn the first gear member and the rotor; a cam in actuating relation with said crank; and a rotatable handle coaxial with the rotor and coupled with the cam to turn it, the cam being formed to vary the rate of turning movement of said crank, and thereby of the rotor, with respect to the rate of turning movement of the handle.

In witness whereof, I hereunto subscribe my name.

JOHN F. LINDBERG.